United States Patent Office 2,917,705
Patented Dec. 15, 1959

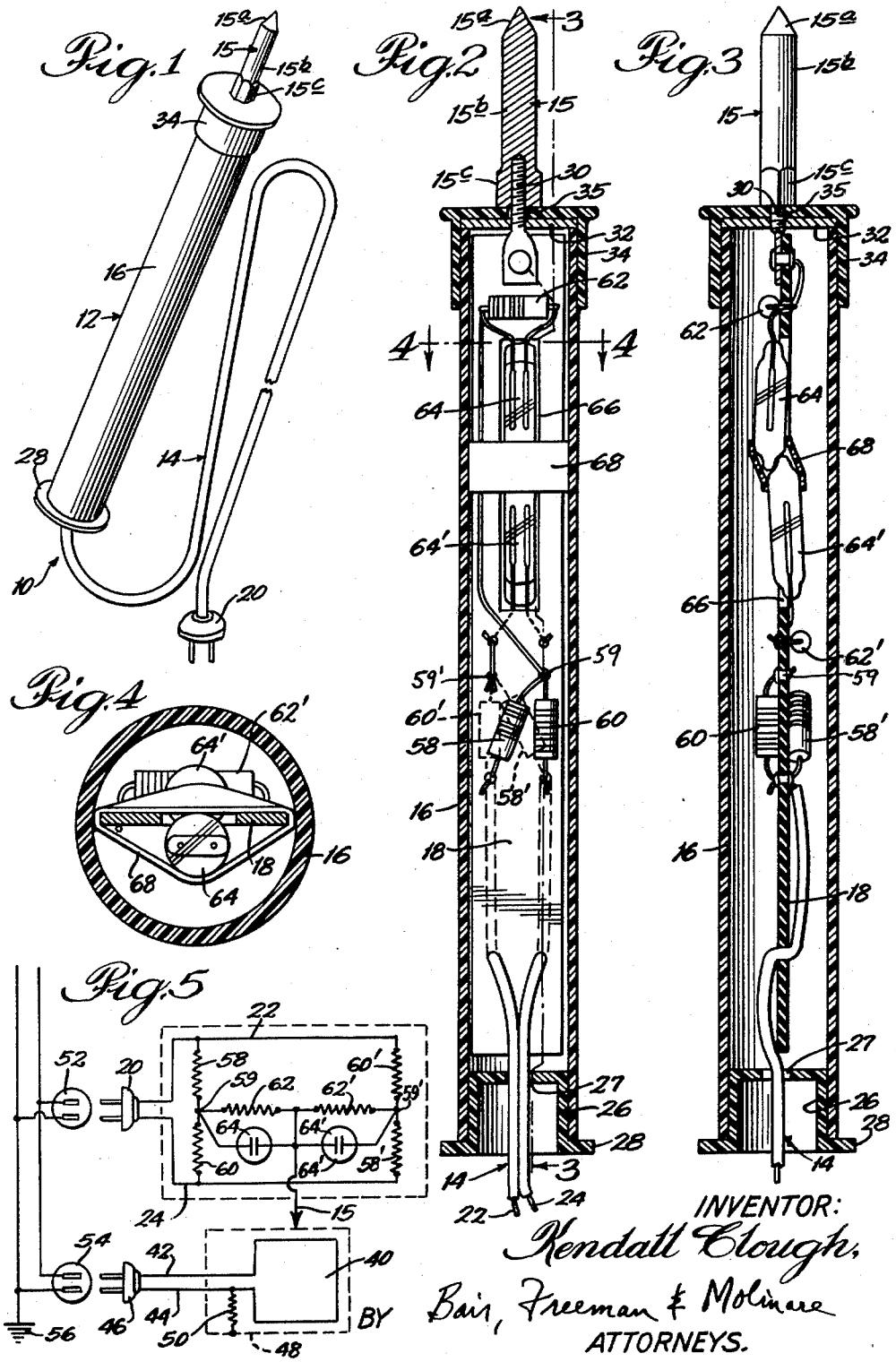
Dec. 15, 1959 — K. CLOUGH — 2,917,705
SAFETY TESTER FOR ELECTRICAL APPLIANCES
Filed March 24, 1958
INVENTOR:
Kendall Clough,
BY Bair, Freeman & Molinare
ATTORNEYS.

2,917,705

SAFETY TESTER FOR ELECTRICAL APPLIANCES

Kendall Clough, Vernon Township, Lake County, Ill., assignor to KG Electronics Corporation, Chicago, Ill., a corporation of Illinois Application March 24, 1958, Serial No. 723,213

3 Claims. (Cl. 324—51)

This invention relates to a device for testing the safety of electrical appliance housings or enclosures.

If the housing or casing of an electric appliance is "hot" (i.e., capable of delivering an electric shock to a person) it is dangerous not only from the standpoint of possible electrocution of a person, but an electric shock, smaller than necessary to electrocute, can cause other severe damage, such as effecting a muscle spasm in the person touching the hot appliance. Thus, the danger of operating shop and household electrical appliances having electrical short circuits or material electrical leakage between their internal circuits and outer enclosures is well known. Numerous appliance testers to indicate this dangerous condition have heretofore been devised, but all prior devices have had important shortcomings.

The two-prong power outlet socket in general use has one prong grounded in installation but usually has no means of visually identifying either the grounded or the hot contact. In view of this, previous appliance testers have had to prescribe a multi-step test routine, which even called for reversal of the tester and appliance plugs in their sockets, and correlation of the several indications, to arrive at a conclusion concerning the condition of the appliance. Such procedures are confusing to a non-technical person, and unless the entire procedure is followed the tests may lead to a false conclusion.

Some appliance testers in use are not sufficiently sensitive, and may indicate "unsafe" only when there is a direct metal-to-metal contact between the appliance circuit and its case. In such cases, appliances with considerable electrical leakage, but not having a direct short, may be indicated as "safe," although not actually so, nor would there be a warning of existing deterioration which may become progressively worse.

On the other hand, some testers are entirely too sensitive and may indicate "unsafe" due to the existence of some inevitable capacitance between the appliance circuit and enclosure, when no actual electrical leakage defect exists. This is particularly apt to be the case with motor-driven appliances, where the conductors in the motor present a considerable amount of effectively energized area separated from the frame by a thin section of insulating material, thereby creating a capacitance which may be determined to exist, but by no means causing the appliance to be unsafe.

The present invention simplifies the test indications so that even the least initiated can secure definite and reliable indications.

Thus, one object of this invention is to provide an appliance tester which will give a definite and easily understood "safe" or "unsafe" indication, regardless of what polarity exists when the appliance plug and the plug of the tester are inserted in ordinary domestic power outlet sockets.

Another object of this invention is to provide an appliance safety tester which will immediately designate, with a single test, the condition of the appliance as "safe" or "unsafe," regardless of the polarity which exists when the plug of the tester is inserted in the power outlet therefor.

A further object of this invention is to provide an appliance safety tester which will indicate not only a direct, or low resistance, short between the appliance and its case but will also indicate other substantial electrical leaks which might, under proper circumstances, cause uncomfortable or more serious electric shocks to operators of the appliance.

Still another object of this invention is to provide an appliance tester which will expose a defective appliance to be "unsafe" even though the appliance happens to be plugged into its power outlet in a safe manner at the time of test.

And another object of this invention is to provide an appliance tester which will disregard small non-dangerous capacitance currents which are frequently associated with many appliances.

And a further object of this invention is to provide a tester having a safe circuit and having safe circuit proportions so that the exposed prod for contacting the tester to the appliance does not present any dangerous potentials or available current if inadvertently contacted by the operator.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a perspective view of an appliance tester embodying the invention;

Figure 2 is an enlarged longitudinal cross-section view of the tester;

Figure 3 is a view taken substantially on line 3—3 of Figure 2;

Figure 4 is a cross-section view taken substantially on line 4—4 of Figure 2; and Figure 5 is a diagrammatic wiring diagram of the electrical components of the tester.

Referring now to the drawings, there is shown a tester 10 which includes casing means 12 adapted to be manually grasped, and having an electric cord and plug means 14 extending from a first end thereof and a test prod 15 extending from the second, or extended, end thereof. More specifically, the casing means 12 includes a dielectric tubular casing member 16 having at least a portion thereof translucent so that a visually observable indicia means within the casing may be viewed. Preferably, the entire casing member 16 is formed of a translucent plastic material.

Positioned within casing member 16 is an elongated, flat, dielectric mounting strip 18 preferably formed of Bakelite, or the like. The width of mounting strip 18 is substantially the same as the inner diameter of tubular casing 16, so that the strip 18 slidably fits into the casing 16 with its longitudinal edges engaging the inner wall of casing 16 to maintain strip 18 centrally located in the casing.

The cord and plug means 14 includes a conventional power plug 20 and a pair of conductors 22 and 24 extending therefrom. A cup-shaped cap 26 of dielectric material, preferably a plastic, is provided centrally bored at 27 so as to be slid onto conductors 22 and 24. The cap 26 is dimensioned to be press-fit into a first end of casing 16 to close said first end of the casing. The cap 26 provides a peripheral flange 28 for engaging a first terminus of casing 16 to position cap 26 thereon, as can best be seen in Figures 2 and 3.

The extended end of casing 16 is arranged so that the terminal edge of the extended end of mounting strip 18 is disposed in the same plane as the terminal edge of the extended end of casing 16. Said extended end of strip 18 has a threaded stud 30 extending therefrom axially of casing 16. A rigid washer 32 is slidably fitted onto stud 30 and is of a dimension to abut the terminal edges of strip 18 and casing 16, but is of smaller peripheral dimension than the outer peripheral dimension of casing 16. A cup-shaped cap 34 of dielectric material, preferably a plastic, is provided centrally apertured at 35 for fitting over stud 30, and over washer 32, and said cap 34 is press-fit over the outer periphery of casing 16 so as to be frictionally held in position. The test prod 15 is tapped for screw connection to the threaded stud 30, and operates through said screw connection to be rigidly mounted on casing 16 by clamping itself and the strip 18 rigidly on opposite sides of the rigid washer 32. The prod 15 is shaped to define a pointed tip 15a, a cylindrical shank 15b, and a polygonal shank portion 15c which facilitates manipulation of the prod 15 during assembly operations.

There is carried on the mounting strip 18 a testing circuit means which electrically connects between the conductors, 22 and 24, and the test prod 15 for determining the presence of dangerous electric leaks on an energized electrical appliance which is to be engaged by the test prod, or electrode, 15. These testing circuit means include indicia which is responsive to a particular electric condition sensed by prod 15, for visually indicating when a dangerous electrical leak has been determined to exist. Since the casing 16 is translucent, the visually indicating indicia may be viewed through the casing. A more complete understanding of the operation of the testing circuit and visual indicating means will now be had by reference to the wiring diagram of Figure 5 and to the illustrations in Figures 2 to 4.

To facilitate description, Figure 5 includes an electrical appliance symbolically illustrated as having electrically energized parts shown as a block, 40, connected to power service cord conductors 42 and 44, and plug 46. The appliance's electrical parts 40 are surrounded by an enclosure 48 which is normally completely insulated from the electrical parts in a perfectly safe appliance. It is proposed to impair the normal insulation, for illustrative discussion purposes, by inclusion of the resistance indicated at 50, which may be a resistance leak as shown or a capacity reactance.

In Figure 5, both the tester and the appliance have access to the power line, such as 115 volts A.-C., by way of receptacles 52 and 54 and one side of the power line is shown grounded at 56, as is customary in house and shop installations.

Referring to the testing circuit elements of the tester, the elements 58, 60, 62, 58', 60' and 62' are resistors whose electrical values are selected in accordance with principles to be disclosed hereinafter. It will be noted that the testing circuit has symmetry in that resistor pairs 58 and 58', 60 and 60', and 62 and 62', have equal companion values. Lamps 64 and 64' are of the glow type, each containing two metal electrodes in a glass tube filled with an inert gas. Their operation is such that, when a voltage is impressed on their terminals which is in excess of a characteristic one called the ignition potential, they glow with a persistent light. As previously stated, the casing 16 is made of a translucent material or provides translucent window portions over these tubes so that the glow, in either tube, is easily seen by the individual operating the testing device.

Resistor pairs 58—60 and 58'—60' function as voltage dividers for the power line voltage such that the voltage across the two lamps 64 and 64' in series is never in excess of their combined ignition potentials when the plug 20 is in the power circuit.

Assume now that the tester and appliance are plugged into the power, just as drawn in Figure 5, so that conductors 24 and 44 are at ground potential. Test prod 15 is then near ground potential due to the short or substantial leakage 50, which has been assumed to exist. Conductor 22 is at 115 or high line voltage and, in a properly proportioned circuit, the potential at the common junction 59 of resistors 58 and 60 will exceed the ignition potential of lamp 64 and it will glow, indicating that the appliance is unsafe.

It should be noted that with the appliance plug 46 inserted in its receptacle as just described, the leakage 50 appears between the appliance enclosure 48 and ground so that it is not actually unsafe as connected. However, the appliance tester of this invention anticipates that the appliance user may later reverse the plug 46 or insert it in another receptacle in the opposite sense and the leakage 50 would then be a hazard since the appliance enclosure 48 would then be at high potential and a person touching it would receive a shock.

Now assume that the appliance plug 46 is plugged in as drawn, with wire 44 on the grounded side of the power circuit, but that the tester plug 20 is reversed so that wire 22 is the ground side. Wire 24 is now at line potential and, since resistors 58' and 60' are proportioned with respect to each other the same as 58 and 60, the potential at the junction 59' of resistors 58' and 60' exceeds the ignition potential of lamp 64' and it glows, showing the appliance to be unsafe.

There are four possible combinations of insertion of the plugs 20 and 46 in their receptacles and two of these combinations have now been traced in detail. Due to the symmetry of the tester circuit, the other two combinations will now be seen to make a lamp glow if a defect 50 exists in the appliance. This permits a definite "safe" or "unsafe" indication to be had by the uninitiated on the first insertion and without prior knowledge as to which of the four possible insertions combinations is being employed. This valuable property is brought about by the symmetry of the circuit employed.

Turning now to a consideration of the broad principle employed in the choice of circuit values so that the other useful properties of this tester circuit will be realized, if the value of resistors 58 and 58' are each designated as $R_1$, and that of 60 and 60' each as $R_2$, the voltage divider function of the resistor pairs can be described as $$K = \frac{R_2}{R_1 + R_2}$$

Further, if the value of the resistors 62 and 62' are each designated as "$r$," the line voltage as "$E$," and the ignition potential of the lamps 64 and 64' as "$e$," then a circuit equation may be set up to solve for the impedance defect at 50 which will cause a lamp to glow, as follows:

$$Z \leq \frac{r\left(K - \frac{e}{E}\right)}{2\frac{e}{E} - (2K - 1)}$$

This provides the essential information for proportioning the appliance tester's circuit in accordance with the intent of this invention. Inspecting the equation, it will be seen that $K$ must be greater than $e/E$ in order that the circuit shall function with realistic values of the appliance fault, or defect, $Z$. However, the difference $(K - e/E)$ may be made as small as the commercial tolerances on resistors will permit so that desired values of $Z$ may be indicated with high values assigned to $r$, resistors 62 and 62'. This causes the test prod 15 to have a high resistance relative to the line voltage and protects the operator in event of personal contact with the prod 15.

The significance of the equation is clarified by use of numerical constants for one specific embodiment of this invention. In this example, the line voltage $E$ is the widely used 115 volts, alternating current. Lamps 64 and 64' are readily available in a type having an ignition potential, $e$, of 50 volts A.-C. Then $e/E$ is 50/115 or .435. To allow for commercial variations, resistors 58 and 58' are assigned a value of 27 kilohms ($R_1$) and resistors 60 and 60', the value of 39 kilohms ($R_2$) and thus K is $$\frac{39}{27+39} \text{ or } .590$$

Using these values and an $r$ of 390 kilohms for resistors 62 and 62', there is provided a test circuit which, according to the equation, will indicate "unsafe" if the appliance leakage (resistive) through resistance 50 is less than about 88 kilohms. An appliance with an 88 kilohm or higher leak might, under proper circumstances, subject its user to a current of 115 v./88 kilohms, or 1.3 milliamperes or less which is considered non-hazardous by most physiological authorities. Also, 88 kilohms, in terms of capacity in a 60 cycle circuit, corresponds to about 0.03 microfarad. Tests of a wide variety of appliances shows that the capacitance between energized circuit and its enclosure seldom exceeds half this value and thus this tester circuit is not subject to "unsafe" indications due to normal capacitance currents.

The test prod 15, if touched, has a potential of only half the line voltage acting through the resistors 62 and 62' in parallel, or 195 kilohms, so that the shock received would be negligible or very slight.

Inspection of the design equation shows that the example is only one of many combinations of values which would bring about the objects of this invention. The essential objects will always be attained provided the difference $(K-e/E)$ is kept small, by proper selection of circuit values, but always made greater than zero.

In the physical device, it will readily be seen, by comparison of the wiring diagram of Figure 5 with Figures 2-4, how the various leads, connections, resistors, and the like, are disposed and connected together on the mounting strip 18. The resistors 58, 60, 62, 58', 60' and 62' are commercially available cartridge-shaped bodies, as shown in the drawings, and the leads extending therefrom are appropriately soldered to connecting points to effect a wired system corresponding to the wiring diagram in Figure 5. A central portion of mounting strip 18 has an elongated rectangular cut-out 66 therein in which the elongated glow lamps 64 and 64' are positioned in relatively endwise relationship as best seen in Figures 2 and 3, and with end portions of the glow lamps 64 and 64' in overlapping position, as best seen in Figure 3. A retainer in the form of a strip of friction tape 68 may be wound around the mounting strip 18 in overlapping position with the free ends of the glow lamps 64 and 64', so as to keep said glow lamps in position on the mounting strip 18.

From the foregoing it will be seen that there has been provided a simple, efficient, and effective tester for determining whether or not an electrical appliance is safe or unsafe with respect to electrical leakage defects involving the housing of the appliance.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A test probe for testing for dangerous electrical leaks from electrical appliances comprising, in combination, a dielectric tubular casing member having at least a portion thereof translucent, an elongated flat dielectric mounting strip of substantially the same width as the inner diameter of said tubular casing member being slidably fitted in said tubular casing, an electric cord-and-plug means extending from one end of said casing member, a conductive prod extending from the other end of said casing member, electrical means carried on said mounting strip and electrically connected between said cord-and-plug means and said prod to provide a testing circuit for determining the presence of dangerous electrical leaks in an energized electrical appliance which is to be engaged by said prod, said electrical means including indicia visually observable through the translucent casing portion and responsive to a particular electric condition sensed by said prod, for indicating when a dangerous electrical leak has been determined to exist, and means rigidly mounting the prod relative to said casing member, including a rigid washer abutting an end of said tubular casing member, and means including said prod and mounting strip for rigidly clamping against both sides of said washer to provide a rigid mounting of said prod relative to said casing member, and dielectric cap means overlying said rigid washer and positioned between the prod and washer and secured to said casing member to close said end of the casing.

2. A circuit for testing for dangerous electrical leaks from electrical appliances comprising, in combination, a pair of leads adapted to be energized by a standard 115-volt source of power, so that one of said leads connects to ground potential, voltage divider means between the leads including a pair of unequal resistances in series having a common junction point, a conductive prod for contacting a portion of an appliance to be tested, a pair of parallel circuits between the common junction point of the voltage divider means and the prod, one of said parallel circuits including a glow lamp which operates to glow visibly when a voltage is impressed thereon in excess of its ignition potential, the other of said parallel circuits having a high resistance relative to line voltage to reduce the electric shock potential that is applied to the conductive prod, and said glow lamp being arranged to glow when the prod encounters an impedance defect in an electrical appliance which is determined from a formula $$Z \leq \frac{r\left(K-\frac{e}{E}\right)}{2e/E-(2K-1)}$$

where Z is the impedance defect, $r$ is the resistance of said other parallel circuit, E is the line voltage, e is the ignition potential of the glow lamp, and K is a voltage divider function determined from the formula $$K=\frac{R_2}{R_1+R_2}$$

where $R_2$ is the resistance of the voltage divider resistance that connects to the grounded lead and $R_1$ is the resistance of the other voltage divider resistance that connects to the other lead.

3. A circuit for testing for dangerous electrical leaks from electrical appliances comprising, in combination, a pair of leads adapted to be energized by a standard 115-volt source of power, so that one of said leads connects to ground potential, a pair of oppositely arranged voltage divider means between the leads, each voltage divider means including a pair of unequal resistances in series having a common junction point, said oppositely arranged pair of voltage divider means providing accommodation for the random connection of either of the leads to ground potential, a conductive prod for contacting a portion of an appliance to be tested, a pair of parallel circuits between each common junction point of a voltage divider means and the prod, one of each pair of parallel circuits including a glow lamp of a pre-selected ignition potential which operates to glow visibly when a voltage is impressed thereon in excess of its ignition potential, and the other circuit of each pair of parallel circuits having a high resistance relative to line voltage to reduce the electric shock potential that may be applied to the conductive prod.

References Cited in the file of this patent

UNITED STATES PATENTS

| | | |
|---|---|---|
| 2,131,517 | Leyburn et al. | Sept. 27, 1938 |
| 2,508,498 | Currier | May 23, 1950 |
| 2,581,497 | Podell | Jan. 8, 1952 |